United States Patent [19]
Gleason

[11] Patent Number: 5,629,492
[45] Date of Patent: May 13, 1997

[54] TECHNIQUE FOR ELIMINATING UNDESIRABLE REFLECTIONS FROM OPTICAL SYSTEMS

[75] Inventor: Thomas J. Gleason, Columbia, Md.

[73] Assignee: The United States of America as represented by the Secretary of the Army, Washington, D.C.

[21] Appl. No.: 634,710

[22] Filed: Nov. 20, 1975

[51] Int. Cl.⁶ .................................................. F41G 1/38
[52] U.S. Cl. .......................... 89/41.19; 33/233; 359/493; 359/501; 359/601
[58] Field of Search .................... 89/41.19; 359/493, 359/501, 601; 33/233

[56] References Cited

U.S. PATENT DOCUMENTS

| | | | |
|---|---|---|---|
| 2,301,126 | 11/1942 | Kribel | 350/156 |
| 2,318,705 | 5/1943 | Morgan | 350/156 |
| 2,527,593 | 10/1950 | Stadler | 350/156 |
| 2,750,833 | 6/1956 | Gross | 350/276 R |
| 2,819,459 | 1/1958 | Dodd | 350/276 |
| 3,305,633 | 2/1967 | Chernoch | 178/6.8 |
| 3,473,867 | 10/1969 | Byrnes | 350/277 |
| 3,527,949 | 9/1970 | Huth et al. | 250/199 |
| 3,548,212 | 12/1970 | Whetter | 89/41 L |
| 3,566,099 | 2/1971 | Makas | 350/156 |
| 3,600,094 | 8/1971 | Liskowitz | 356/118 |
| 3,954,340 | 5/1976 | Blomquist et al. | 89/41 L |
| 4,028,991 | 6/1977 | Kuby | 89/41 L |

FOREIGN PATENT DOCUMENTS

| | | | |
|---|---|---|---|
| 2331034 | 6/1973 | Germany | 89/41 L |

*Primary Examiner*—Nelson Moskowitz
*Attorney, Agent, or Firm*—Saul Elbaum; Freda L. Krosnick; Muzio B. Roberto

[57] ABSTRACT

Undesirable reflections from an element in an optical system are eliminated by passing incoming light through a polarizer and a 45° optical rotator before it strikes the reflective element. The reflected light component is again rotated 45° by the rotator, for a total rotation of 90°, whereupon it is blocked from leaving the system by the polarizer. Alternatively, a quarter wave plate or other circular polarizing component may replace the rotator to result in a net rotation of the polarization of the reflected light by 90°.

6 Claims, 1 Drawing Sheet

5,629,492

TECHNIQUE FOR ELIMINATING UNDESIRABLE REFLECTIONS FROM OPTICAL SYSTEMS

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates to techniques for eliminating reflections from optical systems such as gun sights, in order to prevent optical detection of the presence of such systems.

A technique presently employed to detect the presence and location of enemy troops is the detection of retroreflected light energy. Specifically, a beam of light energy, preferably in the invisible infra-red region of the spectrum, is scanned across an area to be searched. If the scanning beam impinges upon an optical system, such as a gun sight or the like, the beam will be retroreflected from a focal plane in that system back to the energy source. Detection of the retroreflected beam back at the source provides a means of locating enemy installations. This detection technique is diagrammatically illustrated in FIG. 1 wherein an optical system is represented by a lens 10 and focal plane 11. A viewer's eye or other reflective surface is considered to be located at the focal plane. The source of a light beam 12 is spaced sufficiently from lens 10 to be considered located at infinity relative to the lens. Consequently, beam 12 is focused at a point P in focal plane 11. The focal plane reflects the focused light in the form of reflected beam 13 which is imaged at infinity by lens 10. It is the detection of reflected beam 13 which indicates the presence of the illustrated optical system back at the source of beam 12.

The present invention has as its primary object the elimination of reflected beam 13 so that optical detection can be avoided.

SUMMARY OF THE INVENTION

In accordance with the present invention, the source beam which enters the optical system is polarized and spatially rotated by 45° before striking the reflective focal plane. The polarization eliminates one of the two mutually perpendicular components, and the rotation leaves the remaining component shifted 45° from its original position. The reflected light is then further rotated by 45°, for a total shift of 90°, thereby orienting the reflected light so that it is blocked when subsequently polarized once again.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENTS

Figure 1:
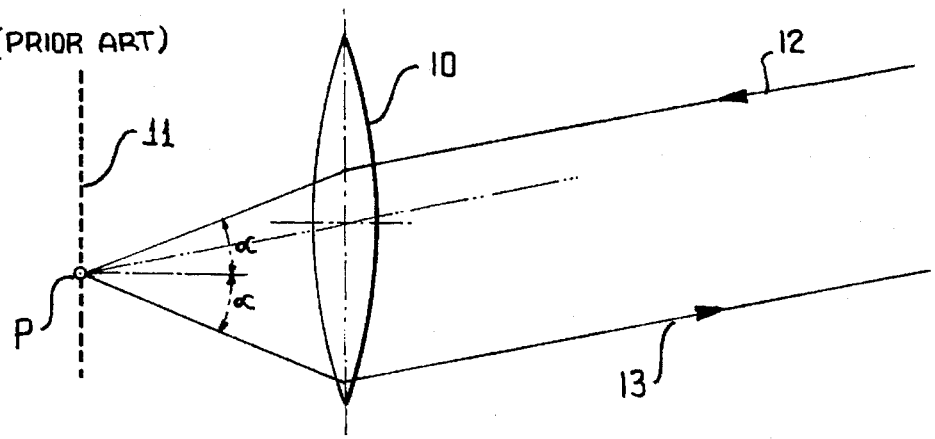
FIG. 1 is a diagrammatic illustration of a reflection sought to be eliminated from an optical system.
Figure 2:
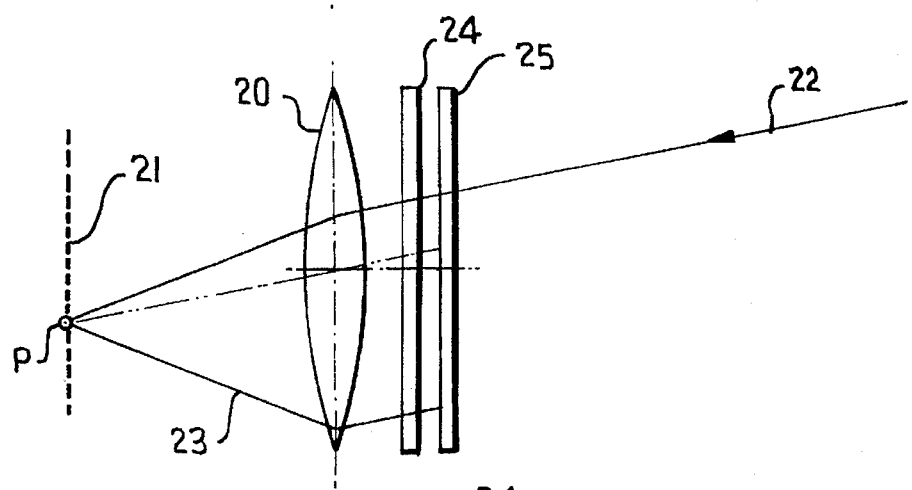
FIG. 2 is a diagrammatic illustration of one embodiment of the present invention.

Referring specifically to FIG. 2 of the accompanying drawings, an optical system according to the present invention includes a lens 20 and focal plane 21. Forward of lens 20 there is provided a quarter wave plate 24, and forward of that there is provided a polarizer 25. The locations of quarter wave plate 24 and polarizer 25 relative to lens 20 may be varied; however, the polarizer must be forward of the quarter wave plate.

As is well known, polarizer 25 passes only one of the two mutually perpendicular components of incoming light beam 22. The passed component is circularly polarized by the quarter wave plate 24 which is oriented with its axes at 45° to the axis of the polarizer. The circularly polarized incoming beam 22 is focused at point P in focal plane 21 by lens 20 and is reflected from the focal plane as reflected beam 23 which is imaged at infinity by lens 20. Reflected beam 23 is passed through quarter wave plate 24 which converts its circular polarization back to linear polarization but in a direction rotated 90° relative to the polarizer axis and thus is blocked by the polarizer 25. That is, the component of beam 22, which is passed by the polarizer and reflected as beam 23, is rotated as the end result of being converted to circular polarization and back to linear polarization by two passes through the quarter wave plate 24 so that it is blocked from passing back out of the system by the polarizer.

Quarter wave plates are well known in the art. Generally these are thin doubly refracting plates designed to produce a quarter wavelength relative phase retardation between two equal amplitude components of a light beam which are spatially oriented at right angles to one another. Such a quarter wave plate converts plane polarized light beam 22 to circularly polarized light. Likewise, when the circularly polarized reflected beam 23 passes back through the quarter wave plate 24 the beam is converted back to plane polarized light. However, since the polarization of the resultant plane polarized light after two passes is rotated 90° relative to the polarization of the input light first passing through polarizer 25, it is now blocked by the polarizer and no reflection is emitted from the system.

Figure 3:
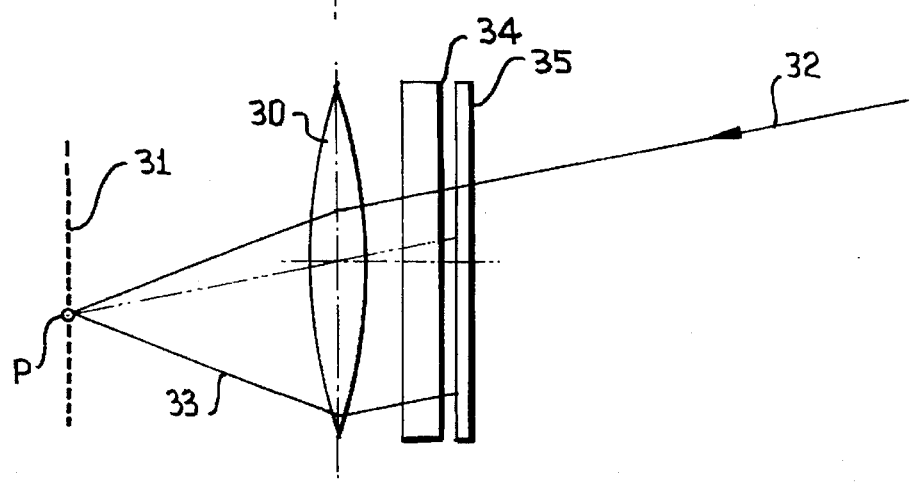
FIG. 3 is a diagrammatic illustration of another embodiment of the present invention.

Other means for producing the two 45° rotations of the light beam may be employed. For example, in FIG. 3 an optical system, including lens 30 and focal plane 31, employs a 45° rotator plate 34 and a polarizer 35 located forward of plate 34. The 45° rotator plate may be a quartz plate or an encapsulated solution of sugar or any other well known device arranged to effect a 45° spatial rotation of the plane of a polarized light beam. Thus, incoming source beam 32 is polarized by polarizer 35 to eliminate one of the mutually perpendicular components of the beam. The remaining component is spatially rotated 45° by rotator plate 34 and then focused at point P in focal plane 31 by lens 30. Reflected beam 33, which is reflected from point P, is passed by lens 30 in a manner to be imaged at infinity. However, in passing through rotator plate 34 beam 33 is spatially rotated 45°, resulting in a 90° total rotation of the component of beam 32 originally passed by polarizer 35. The 90°-rotated beam is now blocked by the polarizer, thereby preventing reflections from leaving the optical system.

Figure 4:
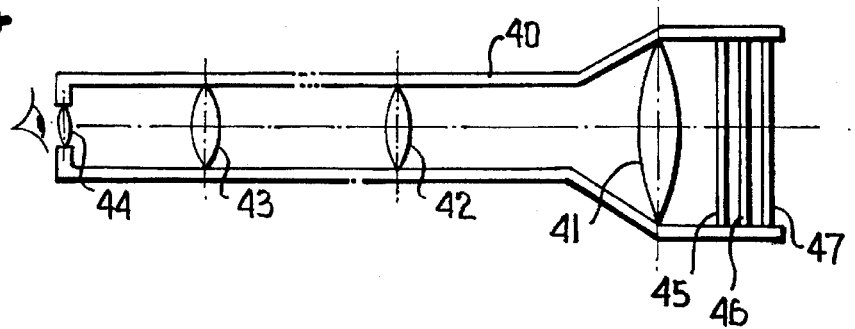
FIG. 4 is a view in section of an optical system according to the present invention.

FIG. 4 serves to illustrate a sight, such as may be used with a weapon, which employs the retroreflection elimination techniques of the present invention. A housing 40 of generally hollow cylindrical configuration has a series of lenses 41, 42, 43, etc. mounted coaxially therein. The lenses are arranged to focus light, which originates from objects sufficiently far away to be considered infinity and which enters the forward end of the housing, at an eye piece 44 located at the rearward end of the housing. A quarter wave plate (or 45° rotator) 45 of the type described hereinabove is disposed rearward of a polarizer 46. An optical bandpass filter 47 is disposed forward of polarizer 46.

Polarization rotators are generally wavelength (or frequency) dependent in which case bandpass filter 47 is employed to absorb or reflect light that is not properly rotated. Filter 47 can also serve as a laser safety filter to protect the eye of the user of the sight against damage from enemy laser beams employed to detect such sights.

The polarizer and rotator (or quarter wave plate) can be located anywhere in the optical path of the system being protected; however, the polarizer must be forward of the rotator.

Naturally, the polarizer results in approximately a 50% loss in visible light. Therefore, it may be desirable to employ a clip-on type polarizer so that it may be removed under certain conditions.

I wish it to be understood that I do not desire to be limited to the exact details of construction shown and described, for obvious modifications can be made by a person skilled in the art.

I claim:

1. In a military optical viewing system, an apparatus which eliminates the detection of retroreflected light energy by a nonuser, the apparatus comprising:

a weapon sight including a hollow housing and an eyepiece in which a plurality of lens members are mounted in spaced relation along an optical path, the elements aligned such that the light energy enters the forward end of the housing and is impinged on the eyepiece at the rearward end of the housing;

a polarizing means, located forward of the eyepiece, along the optical path, operative over a known range of wavelengths for polarizing light entering the system before the light reaches the eyepiece; and a shifting means, located between the polarizing means and the eyepiece and along the optical path, operative over a predetermined range of wavelengths for changing the polarization state of light passed by the polarizing means before the polarized light reaches the eyepiece and such that two passes through said shifting means results in a 90° rotation of the plane of polarization of the light;

whereby light energy which is retroflected off the eyepiece is prevented vented from leaving the optical viewing system and being detected by the nonuser.

2. The apparatus according to claim 1 wherein said shifting means comprises a quarter wave plate.

3. The apparatus according to claim 2 further comprising an optical bandpass filter having a wavelength pass band corresponding to the range of wavelengths over which said polarizer and quarter wave plate are operative.

4. The apparatus according to claim 1 wherein said shifting means is a 45° rotator plate.

5. The apparatus according to claim 4 further comprising an optical bandpass filter having a wavelength pass bank corresponding to the range of wavelengths over which said polarizer and rotator plate are operative.

6. A technique for eliminating retroreflected light energy from military optical viewing systems in order to prevent optical detection of such systems, comprising the steps of:

utilizing an optical system for viewing an intended object, interposing at the light receiving end of the optical system a light energy polarizer which passes only one of the two mutually perpendicular components of light;

subjecting the polarized light to a wave shifter so that the polarized light is spacially rotated by 45°;

observing the intended object at the viewing end of the optical system causing light energy to be reflected back towards the receiving end;

subjecting the reflected light energy again to the wave shifter so that the light is further rotated by 45° for a total shift of 90°, preventing the 90° shifted light energy from being detected by the nonuser by again polarizing the light energy to eliminate the other component of light energy.

\* \* \* \* \*